United States Patent
Han et al.

(10) Patent No.: US 10,100,209 B2
(45) Date of Patent: Oct. 16, 2018

(54) WORK FUNCTION-CONTROLLED CARBON NANOMATERIAL AND METAL NANOWIRE HYBRID TRANSPARENT CONDUCTIVE FILM AND METHOD FOR MANUFACTURING SAME

(71) Applicant: KOREA ELECTROTECHNOLOGY RESEARCH INSTITUTE, Changwon-si, Gyeongsangnam-do (KR)

(72) Inventors: Joong-tark Han, Changwon-si (KR); Geon-woong Lee, Changwon-si (KR); Kang-jun Baeg, Changwon-si (KR); Jong-seuk Woo, Daegu (KR); Seung-yol Jeong, Gimhae-si (KR); Hee-jin Jeong, Changwon-si (KR)

(73) Assignee: KOREA ELECTROTECHNOLOGY RESEARCH INSTITUTE (KR)

(*) Notice: Subject to any disclaimer, the term of this patent is extended or adjusted under 35 U.S.C. 154(b) by 163 days.

(21) Appl. No.: 15/070,607

(22) Filed: Mar. 15, 2016

(65) Prior Publication Data
US 2016/0222227 A1     Aug. 4, 2016

Related U.S. Application Data

(63) Continuation of application No. PCT/KR2015/003440, filed on Apr. 7, 2015.

(30) Foreign Application Priority Data

Apr. 7, 2014   (KR) .................. 10-2014-0041369

(51) Int. Cl.
C09D 5/24       (2006.01)
H01B 5/14       (2006.01)
(Continued)

(52) U.S. Cl.
CPC .............. C09D 5/24 (2013.01); B05D 5/12 (2013.01); C01B 32/15 (2017.08); C01B 32/168 (2017.08);
(Continued)

(58) Field of Classification Search
CPC ... C01B 32/168; C01B 32/174; C01B 32/194; C01B 32/15; H01B 1/02; H01B 1/04;
(Continued)

(56) References Cited

U.S. PATENT DOCUMENTS 9,227,941 B2 *  1/2016  Han ................. H01B 1/04
9,873,811 B2 *  1/2018  Han ................. C09D 11/52
(Continued)

FOREIGN PATENT DOCUMENTS

JP     2009070660 A  *  4/2009
WO  WO-2013154224 A1 * 10/2013 ............ H01B 1/04
WO  WO-2014163236 A1 * 10/2014 ............ H01B 1/04

OTHER PUBLICATIONS

Machine translation of JP-2009070660-A.*

*Primary Examiner* — Kregg T Brooks
(74) *Attorney, Agent, or Firm* — Park & Associates IP Law, P.C.

(57) ABSTRACT

Disclosed is a method of manufacturing a work function-controlled carbon nanomaterial and metal nanowire hybrid transparent conductive film, including: a first step of modifying the surface of a carbon nanomaterial to introduce a functional group to a conductive carbon nanomaterial; a second step of forming a work function-reduced carbon nanomaterial dispersed solution by mixing and reacting the carbon nanomaterial, which is functionalized in the first step, with an isocyanate-based compound and a pyrimidine-based compound; a third step of forming a single-component coating solution by hybridizing the work function-reduced
(Continued)

carbon nanomaterial dispersed solution obtained in the second step with a metal nanowire; and a fourth step of forming a film by applying the coating solution, which is formed in the third step, on a substrate.

13 Claims, 5 Drawing Sheets

(51) Int. Cl.
| | |
|---|---|
| *H01B 13/00* | (2006.01) |
| *B05D 5/12* | (2006.01) |
| *B05D 7/24* | (2006.01) |
| *B82Y 30/00* | (2011.01) |
| *B82Y 40/00* | (2011.01) |
| *C01B 32/15* | (2017.01) |
| *C01B 32/168* | (2017.01) |
| *C01B 32/174* | (2017.01) |
| *C01B 32/194* | (2017.01) |
| *H01B 1/02* | (2006.01) |
| *H01B 1/04* | (2006.01) |

(52) U.S. Cl.
CPC .......... *C01B 32/174* (2017.08); *C01B 32/194* (2017.08); *H01B 1/02* (2013.01); *H01B 1/04* (2013.01); *H01B 5/14* (2013.01)

(58) Field of Classification Search
CPC . H01B 5/14; C09D 5/24; B82Y 30/00; B82Y 40/00; B05D 5/12
See application file for complete search history.

(56) References Cited

U.S. PATENT DOCUMENTS

2015/0218108 A1* 8/2015 Han .................. H01B 1/04
                544/319
2017/0073817 A1* 3/2017 Han .................. C09D 11/52

\* cited by examiner

WORK FUNCTION-CONTROLLED CARBON NANOMATERIAL AND METAL NANOWIRE HYBRID TRANSPARENT CONDUCTIVE FILM AND METHOD FOR MANUFACTURING SAME

REFERENCE TO RELATED APPLICATIONS

This is a continuation of pending International Patent Application PCT/KR2015/003440 filed on Apr. 7, 2015 which designates the United States and claims priority of Korean Patent Application No. 10-2014-0041369 filed on Apr. 7, 2014, the entire contents of which are incorporated herein by reference.

FIELD OF THE INVENTION

The present invention relates to a work function-controlled carbon nanomaterial and metal nanowire hybrid transparent conductive film and a method of manufacturing the same and, more particularly, to a work function-controlled carbon nanomaterial and metal nanowire hybrid transparent conductive film and a method of manufacturing the same, wherein a conductive carbon nanomaterial, such as carbon nanotubes, graphene, etc., is mixed and reacted with an isocyanate-based compound and a pyrimidine-based compound, thus forming a carbon nanomaterial, the work function of which is controlled and which is dispersed without the use of a dispersant, followed by hybridizing the carbon nanomaterial with a metal nanowire having high conductivity, such as a silver nanowire or a copper nanowire, to give a single-component coating solution, which is then used to manufacture a film configured such that a network is formed between the metal nanowire and the carbon nanomaterial, thereby ensuring electrical stability through work function matching of the metal nanowire and solving optical problems such as haze.

BACKGROUND OF THE INVENTION

Typically, a transparent conductive film is used for a plasma display panel (PDP), a liquid crystal display (LCD) device, a light-emitting diode (LED), an organic electroluminescent device (OLED), a touch panel, a solar cell, a transparent heater, etc.

Such a transparent conductive film, having high conductivity (e.g. a sheet resistance of $1 \times 10^3$ $\Omega$/sq or less) and high transmittance in the visible light range, is being utilized for electrodes in a variety of light-receiving and light-emitting devices, as well as solar cells, liquid crystal display devices, plasma display panels, and smart windows, and additional applications thereof include transparent electromagnetic wave-shielding members such as antistatic films and electromagnetic shielding films for windows for vehicles or buildings, and transparent heat-generating members such as solar reflective films, glass showcases, etc.

Examples of the transparent conductive film include a tin oxide ($SnO_2$) film doped with antimony or fluorine, a zinc oxide (ZnO) film doped with aluminum or potassium, and a tin-doped indium oxide ($In_2O_3$) film.

In particular, a tin-doped indium oxide film, namely an $In_2O_3$—Sn film, which is referred to as an ITO (Indium tin oxide) film, is most commonly used because a low-resistance film may be readily acquired. Although ITO is superior in various properties and is mainly applied to processes, indium oxide ($In_2O_3$) is produced as a byproduct from zinc (Zn) mines, and thus the demand therefor and supply thereof are not balanced. Furthermore, an ITO film is not flexible and thus cannot be employed in flexible materials such as polymer substrates, and the production cost thereof is increased because of the manufacture under high-temperature and high-pressure conditions.

Also, the upper surface of a polymer substrate may be coated with a conductive polymer to obtain a flexible display, but the formed film may deteriorate electrical conductivity when exposed to the exterior environment, or may not be transparent, and the use thereof is limited.

With the goal of solving such problems, actively being studied are methods in which various kinds of substrates are coated with carbon nanotubes or metal nanowires as a one-dimensional structure, or alternatively, graphene, having a two-dimensional structure, may be synthesized using chemical vapor deposition and may then be transferred to the substrate. When the carbon nanotubes are provided in the form of a network-type transparent conductive film, junction resistance is very high, making it difficult to drastically lower sheet resistance. In the case where semiconductive carbon nanotubes are contained, they suffer in that they are sensitive to the external environment.

As for metal nanowires, the resistance of nanowires alone is very low and thus, even when they are provided in the form of a network-type transparent conductive film, sheet resistance is remarkably decreased compared to the case of carbon nanotubes. However, in the case where the diameter of the metal nanowires is decreased and the resistance occurring at a junction of the network is high, the junction may be undesirably melted and broken due to electrical influence. Furthermore, the metal nanowires may cause problems of haze and light reflection when applied to displays. Also, when they are applied to multilayered optoelectronic devices, superior characteristics are exhibited, as long as contact problems of upper and lower materials and work function matching problems are solved.

Therefore, in order to apply the metal nanowires to displays, touch panels, various optical devices, transparent heaters, etc., metal nanowire-based transparent conductive films having ensured electrical, optical and mechanical stabilities have to be provided. To this end, there is a need for a single-component carbon nanomaterial and metal nanowire hybrid transparent conductive film in which work function matching problems are solved and which has good dispersibility, even without the use of a dispersant.

SUMMARY OF THE INVENTION

Accordingly, the present invention has been made keeping in mind the above problems encountered in the related art, and an object of the present invention is to provide a work function-controlled carbon nanomaterial and metal nanowire hybrid transparent conductive film and a method of manufacturing the same, wherein a conductive carbon nanomaterial, such as carbon nanotubes, graphene, etc., is mixed and reacted with an isocyanate-based compound and a pyrimidine-based compound, thus forming a carbon nanomaterial, the work function of which is controlled and which is dispersed without the use of a dispersant, followed by hybridizing the carbon nanomaterial with a metal nanowire having high conductivity, such as a silver nanowire or a copper nanowire, to give a single-component coating solution, which is then used to manufacture a film configured such that a network is formed between the metal nanowire and the carbon nanomaterial, thereby ensuring electrical stability through work function matching of the metal nanowire and solving optical problems such as haze.

In order to accomplish the above object, the present invention provides a method of manufacturing a work function-controlled carbon nanomaterial and metal nanowire hybrid transparent conductive film, comprising: a first step of modifying a surface of a carbon nanomaterial to introduce a functional group to a conductive carbon nanomaterial; a second step of forming a work function-reduced carbon nanomaterial dispersed solution by mixing and reacting the carbon nanomaterial, which is functionalized in the first step, with an isocyanate-based compound and a pyrimidine-based compound; a third step of forming a single-component coating solution by hybridizing the work function-reduced carbon nanomaterial dispersed solution obtained in the second step with a metal nanowire; and a fourth step of forming a film by applying the coating solution, which is formed in the third step, on a substrate.

In addition, the present invention provides a work function-controlled carbon nanomaterial and metal nanowire hybrid transparent conductive film, formed by mixing and reacting a carbon nanomaterial having a functional group introduced through acid treatment with an isocyanate-based compound and a pyrimidine-based compound to obtain a work function-reduced carbon nanomaterial dispersed solution, hybridizing the dispersed solution with a metal nanowire, thus preparing a single-component coating solution, and applying the coating solution on a substrate.

The carbon nanomaterial may include at least one selected from the group consisting of single-walled carbon nanotubes, double-walled carbon nanotubes, multi-walled carbon nanotubes, and graphene.

The metal nanowire may include at least one selected from the group consisting of a silver nanowire and a copper nanowire.

The isocyanate-based compound may include at least one selected from the group consisting of ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), naphthalene-1,5-isocyanate (NDI), 2,2'-methylenediphenyl diisocyanate, 5,7-diisocyanatonaphthalene-1,4-dione, isophorone diisocyanate, m-xylene diisocyanate, 3,3'-dimethoxy-4,4'-biphenylene diisocyanate, 3,3'-dimehtoxybenzidine-4,4'-diisocyanate, toluene 2,4-diisocyanate terminal-having poly(propylene glycol), toluene 2,4-diisocyanate terminal-having poly(ethylene glycol), triphenylmethane triisocyanate, diphenylmethane triisocyanate, butane-1,2,2'-triisocyanate, trimethylolpropane tolylene diisocyanate trimer, 2,4,4'-diphenyl ether triisocyanate, isocyanurate having a plurality of hexamethylene diisocyanates, iminooxadiazine having a plurality of hexamethylene diisocyanates, and polymethylene polyphenyl isocyanate.

The pyrimidine-based compound may include at least one selected from the group consisting of 2-amino-6-methyl-1H-pyrido[2,3-d]pyrimidin-4-one, 2-amino-6-bromopyrido[2,3-d]pyridin-4(3H)-one, 2-amino-4-hydroxy-5-pyrimidine carboxylic acid ethyl ester, 2-amino-6-ethyl-4-hydroxypyrimidine, 2-amino-4-hydroxy-6-methyl pyrimidine, and 2-amino-5,6-dimethyl-4-hydroxypyrimidine.

The work function of the carbon nanomaterial is preferably reduced by 0.1 eV or more.

Accordingly, in the manufacture of a transparent conductive film having a network structure configured such that a work function-controlled carbon nanomaterial and a metal nanowire are hybridized, because a carbon nanomaterial having a work function similar to that of the metal nanowire is used, when voltage is applied to the transparent conductive film, current is induced to flow toward the junction between the metal nanowire and the carbon nanomaterial, rather than toward the junction of the metal nanowire, thus assuring the electrical stability of the transparent conductive film. Moreover, the use of a carbon nanomaterial having optically low haze and mechanical stability results in a transparent conductive film in which the haze of the metal nanowire network is lowered and mechanical stability is enhanced.

According to the present invention, a conductive carbon nanomaterial, such as carbon nanotubes, graphene, etc., is mixed and reacted with an isocyanate-based compound and a pyrimidine-based compound, thus forming a carbon nanomaterial, the work function of which is controlled and which is dispersed without the use of a dispersant, followed by hybridizing the carbon nanomaterial with a metal nanowire having high conductivity, such as a silver nanowire or a copper nanowire, to give a single-component coating solution, which is then used to manufacture a film configured such that a network is formed between the metal nanowire and the carbon nanomaterial, thereby ensuring electrical stability through work function matching of the metal nanowire and solving optical problems such as haze.

DETAILED DESCRIPTION OF THE INVENTION

Hereinafter, a detailed description will be given of preferred embodiments of the present invention with reference to the appended drawings.

Figure 1:
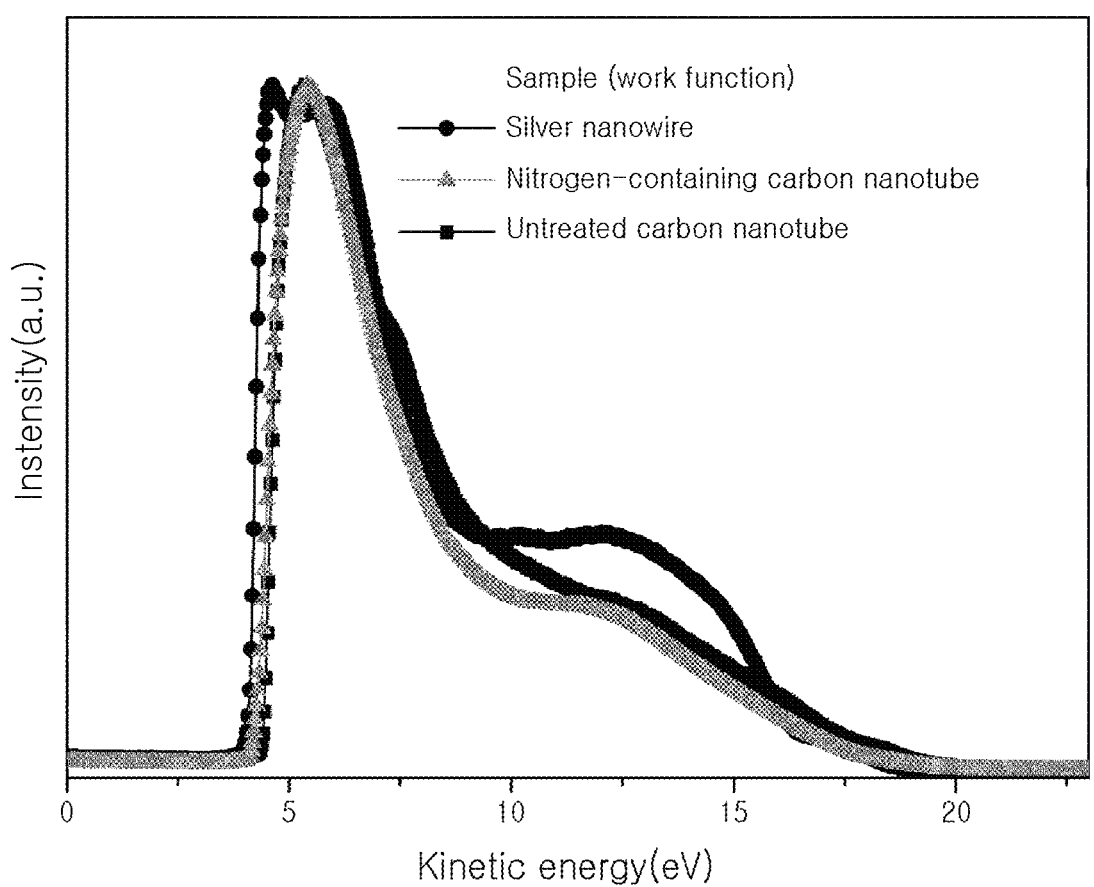
FIG. 1 illustrates the UV photoelectron spectroscopy spectrum, which is analyzed in order to evaluate the work function of a conductor used in the manufacture of a transparent conductive film according to an embodiment of the present invention and a work function measured thereby.
Figure 2A:
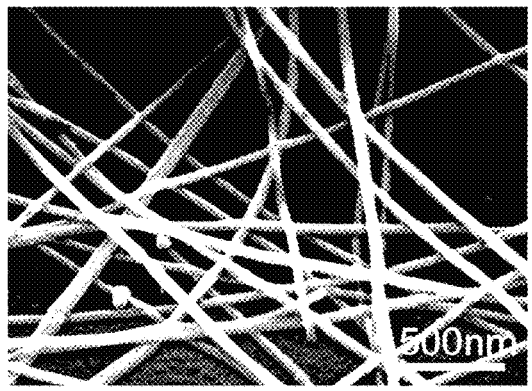
FIGS. 2A to 2D illustrate scanning electron microscope (SEM) images of the silver nanowire/carbon nanotube hybrid transparent conductive film for varying amounts of single-walled carbon nanotubes according to an embodiment of the present invention.
Figure 2B:
Figure 2C:
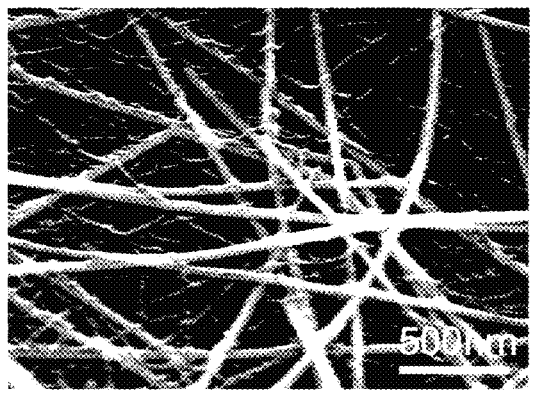
Figure 2D:
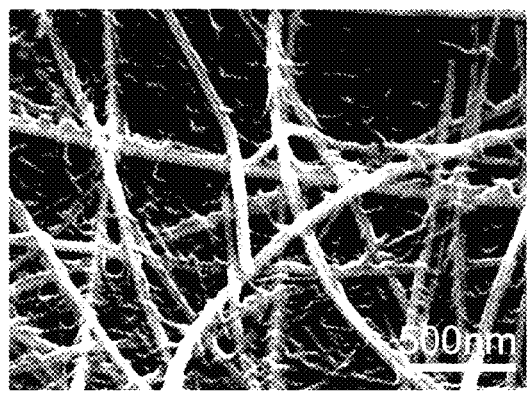
Figure 3A:
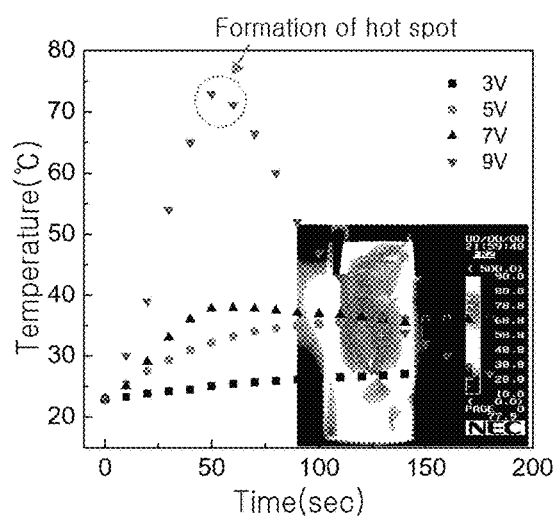
FIGS. 3A to 3B illustrate changes in temperature when voltage is applied to the silver nanowire-transparent conductive film (FIG. 3A) of Comparative Example and the silver nanowire/carbon nanotube hybrid transparent conductive film (FIG. 3B) of Example according to the present invention, and temperature distribution images taken by an IR camera.
Figure 3B:
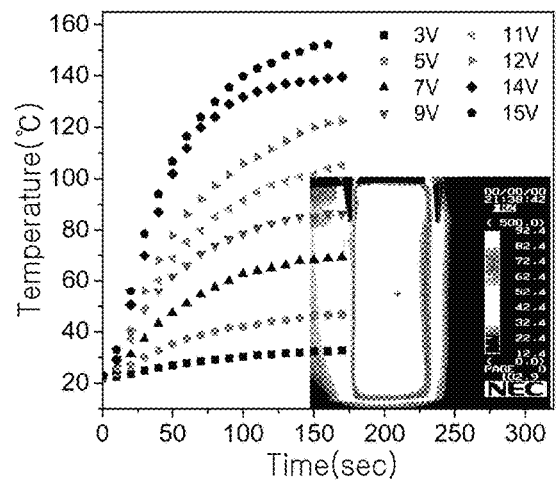
Figure 4A:
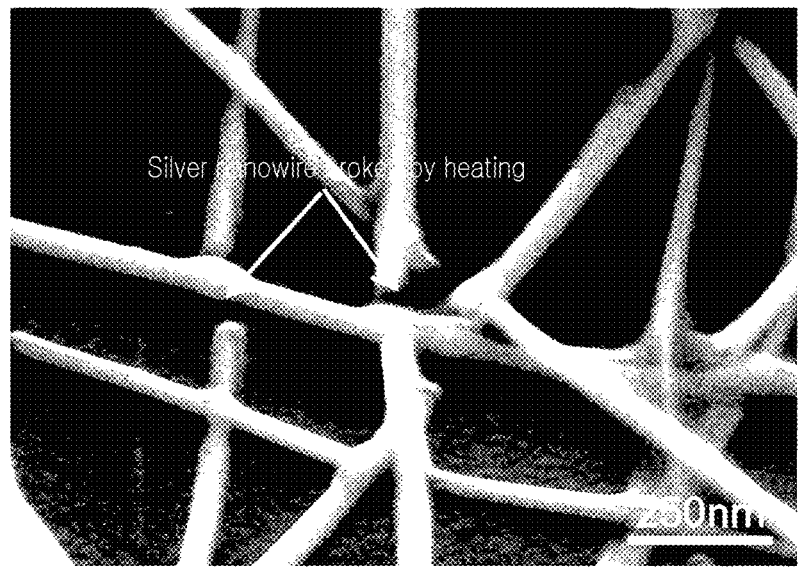
FIGS. 4A to 4B illustrate SEM images of the surfaces of the silver nanowire-transparent conductive film (FIG. 4A) of Comparative Example and the silver nanowire/carbon nanotube hybrid transparent conductive film (FIG. 4B) of Example according to the present invention, after the application of voltage of 10 V.
Figure 4B:
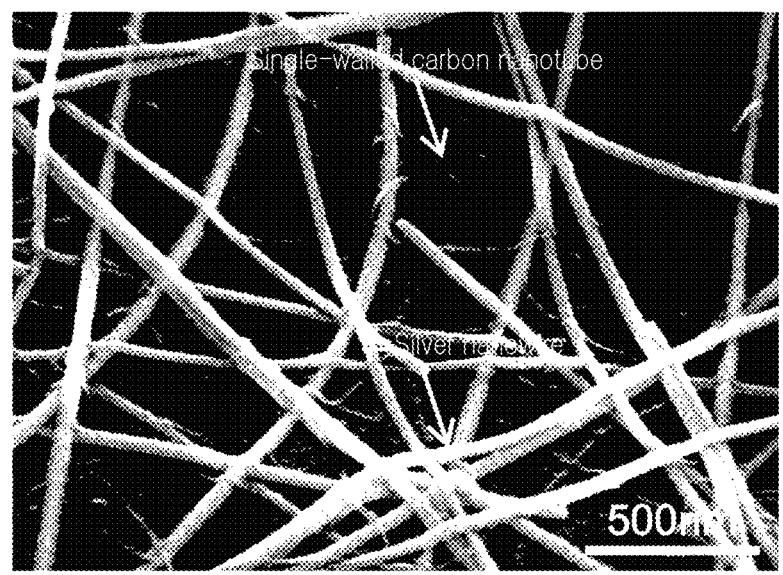
Figure 5A:
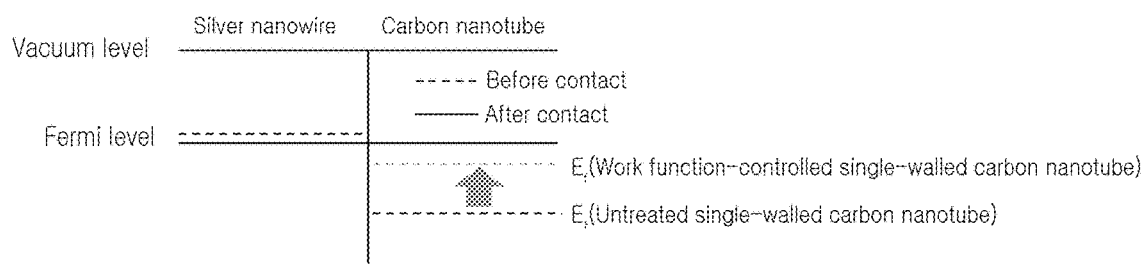
FIG. 5A schematically illustrates the band structure formed in the junction of the silver nanowires and the carbon nanotubes, in which, when the work function is decreased in the present invention, a difference in work function from the silver nanowires is lowered, and FIG. 5B schematically illustrates changes in electricity flow path due to a reduction in the junction resistance of the silver nanowires and the carbon nanotubes.
Figure 5B:
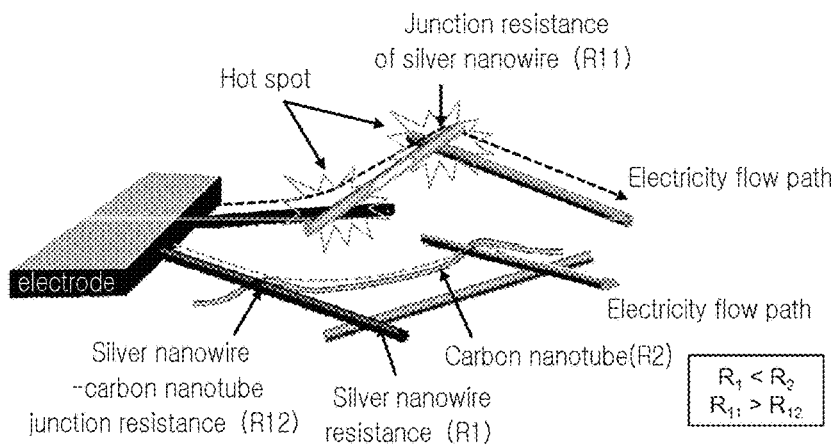

FIG. 1 illustrates the UV photoelectron spectroscopy spectrum, which is analyzed in order to evaluate the work function of a conductor used in the manufacture of a transparent conductive film according to an embodiment of the present invention and a work function measured thereby, FIGS. 2A to 2D illustrate SEM images of the silver nanowire/carbon nanotube hybrid transparent conductive film for varying amounts of single-walled carbon nanotubes according to an embodiment of the present invention, FIGS. 3A to 3B illustrate changes in temperature when voltage is applied to the silver nanowire-transparent conductive film (FIG. 3A) of Comparative Example and the silver nanowire/carbon nanotube hybrid transparent conductive film (FIG. 3B) of Example according to the present invention, and temperature distribution images taken by an IR camera, FIG. 4A to 4B illustrate SEM images of the surfaces of the silver nanowire-transparent conductive film (FIG. 4A) of Comparative Example and the silver nanowire/carbon nanotube hybrid transparent conductive film (FIG. 4B) of Example according to the present invention, after the application of voltage of 10 V, FIG. 5A schematically illustrates the band structure formed in the junction of the silver nanowires and the carbon nanotubes, in which, when the work function is decreased in the present invention, a difference in work function from the silver nanowires is lowered, and FIG. 5B schematically illustrates changes in electricity flow path due to a reduction in the junction resistance of the silver nanowires and the carbon nanotubes.

As illustrated in the drawings, the method of manufacturing a work function-controlled carbon nanomaterial and metal nanowire hybrid transparent conductive film according to the present invention broadly comprises: a first step of modifying the surface of a carbon nanomaterial, a second step of forming a work function-reduced carbon nanomaterial dispersed solution, a third step of forming a single-component coating solution by hybridizing the carbon nanomaterial dispersed solution and metal nanowires, and a fourth step of forming a film by applying the coating solution on a substrate.

An embodiment of the present invention is directed to a method of manufacturing a transparent conductive film configured such that the carbon nanotubes and the metal nanowires are hybridized using a coating solution obtained by mixing work function-controlled single-walled carbon nanotubes with metal nanowires. In the present embodiment, the work function of the carbon nanotubes is lowered in a manner in which a functional group containing a large number of nitrogen atoms is introduced.

The first step is described below.

Specifically, 10 g of single-walled carbon nanotubes are mixed with 200 mL of a mixed solution comprising sulfuric acid and nitric acid (7:3 volume ratio), and the resulting mixture is heated to 80° C., stirred for 24 hr, and then cooled to room temperature.

Thereafter, the mixture is diluted with 800 mL of distilled water.

The diluted solution is filtered four times or more with filter paper so that the remaining acid solution is removed from the carbon nanotubes, followed by a drying process, thereby affording single-walled carbon nanotubes having a carboxyl functional group (—COOH) introduced thereto.

In the next second step, the single-walled carbon nanotubes having a carboxyl group (—COOH) are dispersed in an amount of 100/L in an N-methyl pyrrolidone solvent, mixed with toluene diisocyanate as a diisocyanate compound, and reacted with stirring at 100° C. for 12 hr, whereby the isocyanate group is introduced.

Subsequently, the carbon nanotubes having the isocyanate group introduced thereto are mixed with 2-amino-4-hydroxy-6-methyl-pyrimidine and stirred at 100° C. for 20 hr so as to carry out a junction reaction, thereby injecting electrons to the carbon nanotubes to thus introduce 2-ureido-4[1H]pyrimidinone containing a plurality of nitrogen atoms, which are able to reduce the work function. This is deemed to be because nitrogen atoms are electron-rich.

The work function of the single-walled carbon nanotubes is measured using ultraviolet photoelectron spectroscopy. The results are shown in FIG. 1.

In FIG. 1, the untreated carbon nanotubes are the carbon nanotubes of Comparative Example after the first step and before the second step, and the nitrogen-containing carbon nanotubes are the work function-reduced carbon nanotubes after the first and second steps. As illustrated in FIG. 1, the work function of the nitrogen-containing carbon nanotubes according to the present invention is decreased by 0.4 eV compared to the untreated single-walled carbon nanotubes, thus reaching 4.3 eV. Through the first and second steps, the work function of the carbon nanotubes approximates that of silver nanowire.

In an embodiment of the present invention, the single-walled carbon nanotubes having a functional group introduced thereto are mixed and reacted with an isocyanate-based compound and a pyrimidine-based compound, thereby reducing the work function of the single-walled carbon nanotubes.

In the next third step, the work function-controlled single-walled carbon nanotubes are dispersed in an N-methylpyrrolidone solvent without the other additives, added in different amounts to a solution of silver nanowires dispersed in distilled water, and simply stirred, thus easily preparing a coating solution in which the amount of the single-walled carbon nanotubes is adjusted.

The prepared coating solution is applied on a polymer substrate using a spray coater, yielding a transparent conductive film.

Examples of the substrate may include glass, quartz, a silicon wafer, plastics, etc.

The solution is applied on the substrate using any process selected from the group consisting of spraying, dipping, spin coating, screen printing, inkjet printing, pad printing, knife coating, kiss coating, gravure coating, and slit coating.

FIGS. 2A-2D illustrate the SEM images of the surface of the transparent conductive film for varying amounts of the single-walled carbon nanotubes according to an embodiment of the present invention.

FIG. 2A shows the case where carbon nanotubes are not contained, FIG. 2B shows the case where the weight ratio of silver nanowires and carbon nanotubes is 97:3, FIG. 2C shows the case where the weight ratio of silver nanowires and carbon nanotubes is 93:7, and FIG. 2D shows the case where the weight ratio of silver nanowires and carbon nanotubes is 80:20. As shown in FIGS. 2B to 2D, the silver nanowires and the carbon nanotubes are configured such that a network is formed therebetween.

FIG. 3A to FIG. 3B illustrate changes in temperature when voltage is applied to the silver nanowire transparent conductive film of Comparative Example (FIG. 3A) and the silver nanowire/carbon nanotube hybrid transparent conductive film of Example according to the present invention (FIG. 3B), the temperature distribution images being taken by an IR camera.

In FIG. 3, when the transparent conductive film was formed of only the silver nanowires (FIG. 3A), hot spots were formed even at a low voltage of 9 V, and thus the silver nanowires were melted. However, the conductive film including the work function-controlled carbon nanotubes was stably heated even when a voltage of 15 V or more was applied, as is illustrated in FIG. 3B.

This can be also confirmed in FIG. 4. Based on the results of SEM observation of the surface of the film after the application of voltage, in the transparent conductive film (FIG. 4A) having no work function-controlled single-walled carbon nanotubes, the junctions of the silver nanowires were broken due to high-temperature heating. However, as for the transparent conductive film (FIG. 4B) of Example according to the present invention, having work function-controlled single-walled carbon nanotubes, a stable film was formed without damage to the silver nanowires.

This is described with reference to FIG. 5. As illustrated in FIG. 5A, when the carbon nanotubes are mixed and reacted with the isocyanate-based compound and the pyrimidine-based compound in this way, the work function of the carbon nanotubes is reduced, and thus approximates the work function of the silver nanowires. As illustrated in FIG. 5B, electricity is allowed to flow not toward the junctions of the silver nanowires but toward the junctions between the silver nanowires and the carbon nanotubes, whereby local heating is minimized at the junctions and thus the electrical stability of the silver nanowires is maintained.

As described above, in the manufacture of the transparent conductive film having a network structure by hybridizing the work function-controlled carbon nanomaterial with the metal nanowire, the work function of the carbon nanomaterial is controlled so as not to generate a significant difference from the work function of the metal nanowire. Hence, when voltage is applied to the transparent conductive film, current is induced to flow toward the junction between the metal nanowire and the carbon nanomaterial, rather than toward the junction of the metal nanowire, thus assuring the electrical stability of the transparent conductive film. As well, the use of the carbon nanomaterial having optically low haze and mechanical stability results in a transparent conductive film in which the haze of the metal nanowire network is lowered and mechanical stability is enhanced.

The present invention pertains to a work function-controlled carbon nanomaterial and metal nanowire hybrid transparent conductive film and a method of manufacturing the same. More particularly, the present invention can be useful in realizing a work function-controlled carbon nanomaterial and metal nanowire hybrid transparent conductive film, and is expected to be useful in the manufacture fields thereof, wherein a conductive carbon nanomaterial, such as carbon nanotubes, graphene, etc., is mixed and reacted with an isocyanate-based compound and a pyrimidine-based compound, thus forming a carbon nanomaterial, the work function of which is controlled and which is dispersed without the use of a dispersant, followed by hybridizing the carbon nanomaterial with a metal nanowire having high conductivity, such as a silver nanowire or a copper nanowire, to give a single-component coating solution, which is then used to manufacture a film configured such that a network is formed between the metal nanowire and the carbon nanomaterial, thereby ensuring electrical stability through work function matching of the metal nanowire and solving optical problems such as haze.

What is claimed is:

1. A work function-controlled carbon nanomaterial and metal nanowire hybrid transparent conductive film, formed using a treated carbon nanomaterial by mixing and reacting an untreated carbon nanomaterial having a functional group introduced through acid treatment with an isocyanate-based compound and a pyrimidine-based compound to obtain a work function-reduced carbon nanomaterial dispersed solution without using a dispersant, the work function reduction of the treated carbon nanomaterial is relative to an original work function of the untreated carbon nanomaterial, so that a work function of the treated carbon nanomaterial matches a further work function of a metal nanowire, hybridizing the dispersed solution with the metal nanowire, thus preparing a single-component coating solution, and applying the coating solution on a substrate.

2. The hybrid transparent conductive film of claim 1, wherein the metal nanowire comprises at least one selected from the group consisting of a silver nanowire and a copper nanowire.

3. The hybrid transparent conductive film of claim 1, wherein the isocyanate-based compound comprises at least one selected from the group consisting of ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODD, toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), naphthalene-1,5-isocyanate (NDI), 2,2'-methylenediphenyl diisocyanate, 5,7-diisocyanatonaphthalene-1,4-dione, isophorone diisocyanate, m-xylene diisocyanate, 3,3'-dimethoxy-4,4'-biphenylene diisocyanate, 3,3'-dimehtoxybenzidine-4,4'-diisocyanate, toluene 2,4-diisocyanate terminal-having poly(propylene glycol), toluene 2,4-diisocyanate terminal-having poly(ethylene glycol), triphenylmethane triisocyanate, diphenylmethane triisocyanate, butane-1,2,2'-triisocyanate, trimethylolpropane tolylene diisocyanate trimer, 2,4,4'-diphenyl ether triisocyanate, isocyanurate having a plurality of hexamethylene diisocyanates, iminooxadiazine having a plurality of hexamethylene diisocyanates, and polymethylene polyphenyl isocyanate.

4. The hybrid transparent conductive film of claim 1, wherein the pyrimidine-based compound comprises at least one selected from the group consisting of 2-amino-6-methyl-1H-pyrido[2,3-d]pyrimidin-4-one, 2-amino-6-bromopyrido[2,3-d]pyridin-4(3H)-one, 2-amino-4-hydroxy-5-pyrimidine carboxylic acid ethyl ester, 2-amino-6-ethyl-4-hydroxypyrimidine, 2-amino-4-hydroxy-6-methyl pyrimidine, and 2-amino-5,6-dimethyl-4-hydroxypyrimidine.

5. The hybrid transparent conductive film of claim 1, wherein the work function of the carbon nanomaterial is reduced by 0.1 eV or more.

6. The hybrid transparent conductive film of claim 1, wherein the treated or untreated carbon nanomaterial comprises at least one selected from the group consisting of single-walled carbon nanotubes, double-walled carbon nanotubes, multi-walled carbon nanotubes, and graphene.

7. The hybrid transparent conductive film of claim 1, wherein the applied coating solution is adapted to provide electrical current flowing through junctions between the metal nanowire and the treated carbon nanomaterial.

8. A method of manufacturing a work function-controlled carbon nanomaterial and metal nanowire hybrid transparent conductive film formed using a treated carbon nanomaterial, the method comprising:
    modifying a surface of an untreated carbon nanomaterial to introduce a functional group to a conductive carbon nonmaterial to form a functionalized carbon nanomaterial;
    forming a work function-reduced carbon nanomaterial dispersed solution, comprising the treated carbon nanomaterial, by mixing and reacting the functionalized carbon nanomaterial with an isocyanate-based compound and a pyrimidine-based compound without using a dispersant, the work function reduction of the treated carbon nanomaterial is relative to an original work function of the untreated carbon nanomaterial, so that a work function of the treated carbon nanomaterial matches a further work function of a metal nanowire;
    forming a single-component coating solution by hybridizing the work function-reduced carbon nanomaterial dispersed solution with the metal nanowire; and
    forming a film by applying the coating solution on a substrate.

9. The method of claim 8, wherein the carbon nanomaterial comprises at least one selected from the group consisting of single-walled carbon nanotubes, double-walled carbon nanotubes, multi-walled carbon nanotubes, and graphene.

10. The method of claim 8, wherein the metal nanowire comprises at least one selected from the group consisting of a silver nanowire and a copper nanowire.

11. The method of claim 8, wherein the isocyanate-based compound comprises at least one selected from the group consisting of ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), naphthalene-1,5-isocyanate (NDI), 2,2'-methylenediphenyl diisocyanate, 5,7-diisocyanatonaphthalene-1,4-dione, isophorone diisocyanate, m-xylene diisocyanate, 3,3'-dimethoxy-4,4'-biphenylene diisocyanate, 3,3'-dimehtoxybenzidine-4,4'-diisocyanate, toluene 2,4-diisocyanate terminal-having poly(propylene glycol), toluene 2,4-diisocyanate terminal-having poly(ethylene glycol), triphenylmethane triisocyanate, diphenylmethane triisocyanate, butane-1,2,2'-triisocyanate, trimethylolpropane tolylene diisocyanate trimer, 2,4,4'-diphenyl ether triisocyanate, isocyanurate having a plurality of hexamethylene diisocyanates, iminooxadiazine having a plurality of hexamethylene diisocyanates, and polyethylene polyphenyl isocyanate.

12. The method of claim 8, wherein the pyrimidine-based compound comprises at least one selected from the group consisting of 2-amino-6-methyl-1H-pyrido[2,3-d]pyrimidin-4-one, 2-amino-6-bromopyrido[2,3-d]pyridin-4(3H)-one, 2-amino-4-hydroxy-5-pyrimidine carboxylic acid ethyl ester, 2-amino-6-ethyl-4-hydroxypyrimidine, 2-amino-4-hydroxy-6-methyl pyrimidine, and 2-amino-5,6-dimethyl-4-hydroxypyrimidine.

13. The method of claim 8, wherein the work function of the carbon nanomaterial material is reduced by 0.1 eV or more.

* * * * *